United States Patent [19]
Bessho

[11] Patent Number: 5,796,702
[45] Date of Patent: Aug. 18, 1998

[54] OPTICAL PICKUP SYSTEM FOR AN OPTICAL DISC PLAYER

[75] Inventor: Akira Bessho. Saitama-ken. Japan

[73] Assignee: Pioneer Electronic Corporation. Tokyo. Japan

[21] Appl. No.: 851,532

[22] Filed: May 5, 1997

[30] Foreign Application Priority Data

May 9, 1996 [JP] Japan .................... 8-115030

[51] Int. Cl.[6] ........................... G11B 7/00
[52] U.S. Cl. ........................ 369/112; 369/244
[58] Field of Search ................ 369/44.14, 44.19, 369/44.23, 44.32, 94, 112, 294, 215, 219

[56] References Cited

U.S. PATENT DOCUMENTS

| 5,029,157 | 7/1991 | Bessho | 369/244 |
|---|---|---|---|
| 5,673,247 | 9/1997 | Sekimoto et al. | 369/112 |
| 5,687,154 | 11/1997 | Tsuchiya et al. | 369/112 |

*Primary Examiner*—Tod R. Swann
*Assistant Examiner*—Kim-Kwok Chu
*Attorney, Agent, or Firm*—Nikaido. Marmelstein. Murray & Oram LLP

[57] ABSTRACT

An optical pickup system is provided for two kinds of discs which are different in thickness. A rack is provided to be moved in the radial direction of the disc beyond a reproducing stroke area of a pickup to over-stroke areas at opposite sides of the reproducing stroke area. Two optical elements are provided to be moved together with the rack for changing the condensed positions of laser beam for performing reproduction of the discs. The pickup and the rack are detachably engaged in the reproducing area and in the over-stroke areas, respectively. The rack is moved to the opposite over-stroke areas by a motor. A pair of stoppers are provided for stopping the pickup at opposite ends of the reproducing stroke area so that relative positions of the pickup to the rack are changed in the over-stroke area, respectively. The optical elements are arranged to effect the reproduction of a corresponding kind of disc based on the change of the relative position of the pickup.

5 Claims, 7 Drawing Sheets

OPTICAL PICKUP SYSTEM FOR AN OPTICAL DISC PLAYER

BACKGROUND OF THE INVENTION

The present invention relates to a an optical pickup system for an optical disc player, and more particularly to an optical pickup system which can reproduce various kinds of optical discs having a different standard such as CD and DVD.

A CD (compact disc) comprises a plastic layer having a thickness about 1.2 mm on which signals are recorded, a metallic reflection layer having an extremely thin thickness coated on the plastic layer, and a hard protection layer coated on the reflection layer. The signal on the plastic layer is irradiated with a laser beam having a wavelength about 780 μm, and read by an optical pickup.

On the other hand, in a DVD (digital video disc) development of which is recently noticed, storage capacity is largely increased compared with the conventional discs. The DVD comprises two discs adhered to each other. Each disc has a thickness of 0.6 mm, and signals recorded on each disc is irradiated with a laser beam having a wavelength about 650 or 635 μm, and read by an optical pickup.

Although CD and DVD have a different standard, drive systems of the CD and the DVD have many common structures. Accordingly, if main elements such as a pickup are individually provided corresponding to the different standards, it is possible to obtain a compatible single drive system for the CD and the DVD.

For example, a pickup for the CD and a pickup for the DVD are provided in a disc player. However, in this case, it is necessary to provide a moving system for moving the individual pickup in a radial direction of the CD or the DVD. Therefore, the miniaturizing of the system can not be achieved.

If a single pickup is provided in a disc player for reproducing both the CD and the DVD, the system can be miniaturized. However, in this case, it is necessary to change a wavelength of the laser beam in accordance with the CD and the DVD. Furthermore, an objective lens of the pickup for one of the discs has a different focal point from the other, because of the difference in thickness of the plastic layer. If such a pickup is used for the other disc (for example, DVD), a condensed beam on a recording surface of the other disc produces spherical aberration. Therefore, it is necessary to change the objective lens having the design of focal point corresponding to the CD and the DVD.

However, the change of objective lens causes an actuator to complicate. Furthermore, the size of the pickup can not be reduced.

SUMMARY OF THE INVENTION

An object of the present invention is to provide an optical pickup system in which various kinds of optical discs having a different standard can be recorded and reproduced with a simple structure.

According to the present invention, there is provided an optical pickup system for an optical disc player for reproducing at least two kinds of discs which are different from each other in standard, comprising, a pickup provided to be moved in a radial direction of the discs within a reproducing stroke area or a scan area, a rack provided to be moved in the radial direction beyond the reproducing stroke area to over-stroke areas or over-scan areas at opposite sides of the reproducing stroke area, at least two optical elements provided to be moved together with the rack for performing reproduction of the discs, engaging means for detachably engaging the pickup and the rack in the reproducing area and in the over-stroke areas, respectively, driving means for moving the rack to the opposite over-stroke areas, a pair of stoppers for stopping the pickup engaged with the rack by the engaging means at opposite ends of the reproducing stroke area so that relative positions of the pickup to the rack are changed in the over-stroke area, respectively, the optical elements being arranged to effect the reproduction of a corresponding kind of disc based on the change of the relative position of the pickup.

The difference in standard is different in thickness of the disc. The engaging means comprises an engaging spring having a V-shaped engaging tip provided on the pickup, and a pair of notches formed on the rack to be engaged with the V-shaped tip in respective reproducing operations.

A pair of switches are provided to be operated by the rack at opposite stroke ends so as to perform respective reproducing operations.

These and other objects and features of the present invention will become more apparent from the following detailed description with reference to the accompanying drawings.

BRIEF DESCRIPTION OF DRAWINGS

FIG. 3 is an enlarged plan view of the pickup system of FIG. 2a;

DETAILED DESCRIPTION OF THE PREFERRED EMBODIMENT

Figure 1:
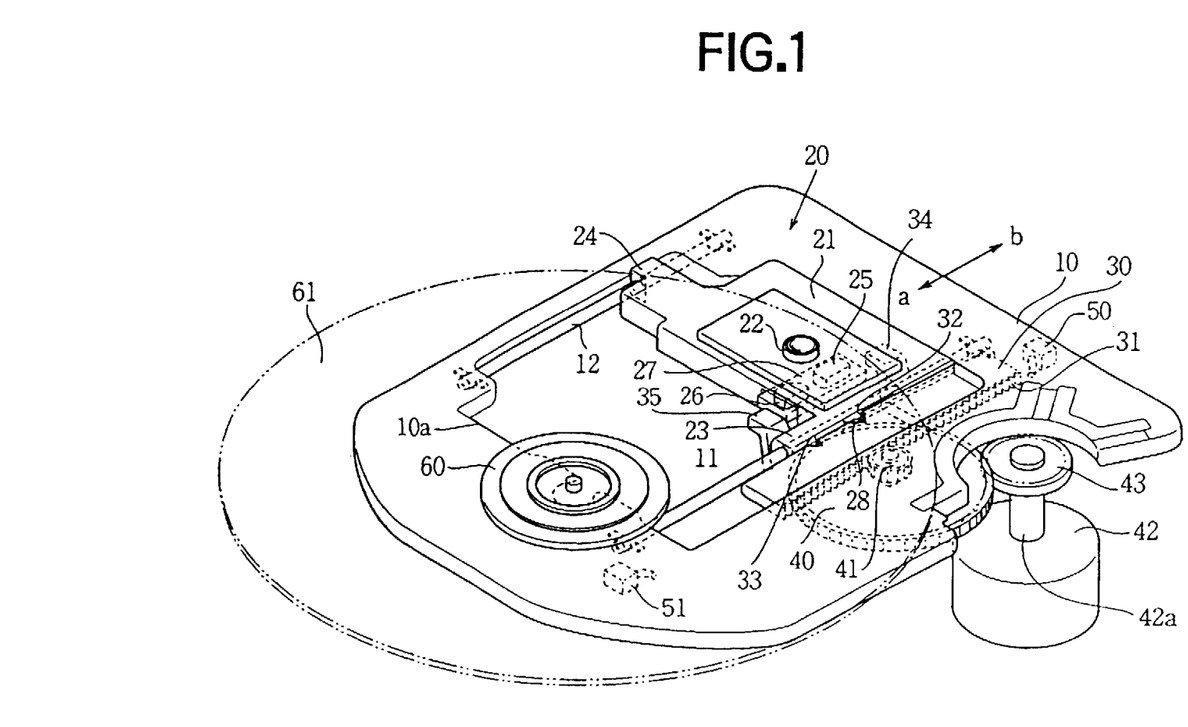
FIG. 1 is a perspective view showing an optical pickup system according to the present invention.

Referring to FIG. 1, an optical pickup system of the present invention has a base plate 10 mounted on a portion lower than a turntable 60. On the turntable 60, an optical disc 61 is clamped. The base plate 10 has a rectangular opening 10a, and a pair of guide shafts 11 and 12 provided in the opening 10a on opposite sides for guiding an optical pickup 20 in the radial direction of the disc 61 as shown by arrows a and b.

The optical pickup 20 has a casing 21 having a pair of opposite arms 23 and 24 slidably engaged with the guide shafts 11 and 12, respectively. The arm 23 has an engaging spring 28 having a V-shaped engaging tip, secured to a side portion thereof. The optical pickup 20 comprises an objective lens 22 exposed from the casing 21, and a laser diode (not shown) mounted in the casing. The laser diode is formed to selectively emit laser beams having a wavelength of 780 n m corresponding the CD and a wavelength of 650 n m (or 635 n m) corresponding to the DVD.

In order to move the pickup 20 in the radial direction a or b along the guide shafts 11, 12, a rack 30 is slidably mounted on the arm 23 of the casing 21. The rack 30 has a pair of notches 32 and 33 formed on the opposite side to the teeth to be selectively engaged with the engaging tip of the spring 28. Thus, the pickup 20 is detachably connected with the rack 30 through the engaging spring 28.

The rack 30 further has a pair of arms 34 and 35 extending to a lower portion of the casing 21 for supporting an optical element panel 27 therebetween. In order to change an optical system of the pickup 20 in dependency on the standard of the disc to be reproduced, the panel 27 has optical elements 25 and 26 such as elements for changing the condensed positions of the beam for respective discs, or collimator lens. The optical element 25 has a function for an optical system of the CD, and the optical element 26 has a function for an optical system of the DVD. When one of the optical elements 25, 26 is selected, the selected optical element is positioned at the objective lens 22 which is exposed on the upper portion of the casing 21.

The rack 30 is engaged with a pinion 41 which is coaxial with a gear 40 rotatably mounted on the underside of the base plate 10. The gear 40 is engaged with a drive gear 43 secured to a drive shaft 42a of a drive motor 42.

In moving operation, when the drive shaft 42a of the drive motor 42 is rotated in opposite directions, the rack 30 is moved in the directions a and b through the gears 43 and 40 and the pinion 41. Thus, the pickup 20 connected with the rack 30 is moved in the directions a and b within a reproducing stroke area. However, the rack 30 is adapted to be disengaged from the spring 28 and can be moved beyond the reproducing stroke area to an over-stroke area as described hereinafter.

In the pickup 20, since the casing 21 is guided by the guide shafts 11, 12, the movement of the pickup is regulated by the opposite peripheries of the opening 10a.

Figure 6:
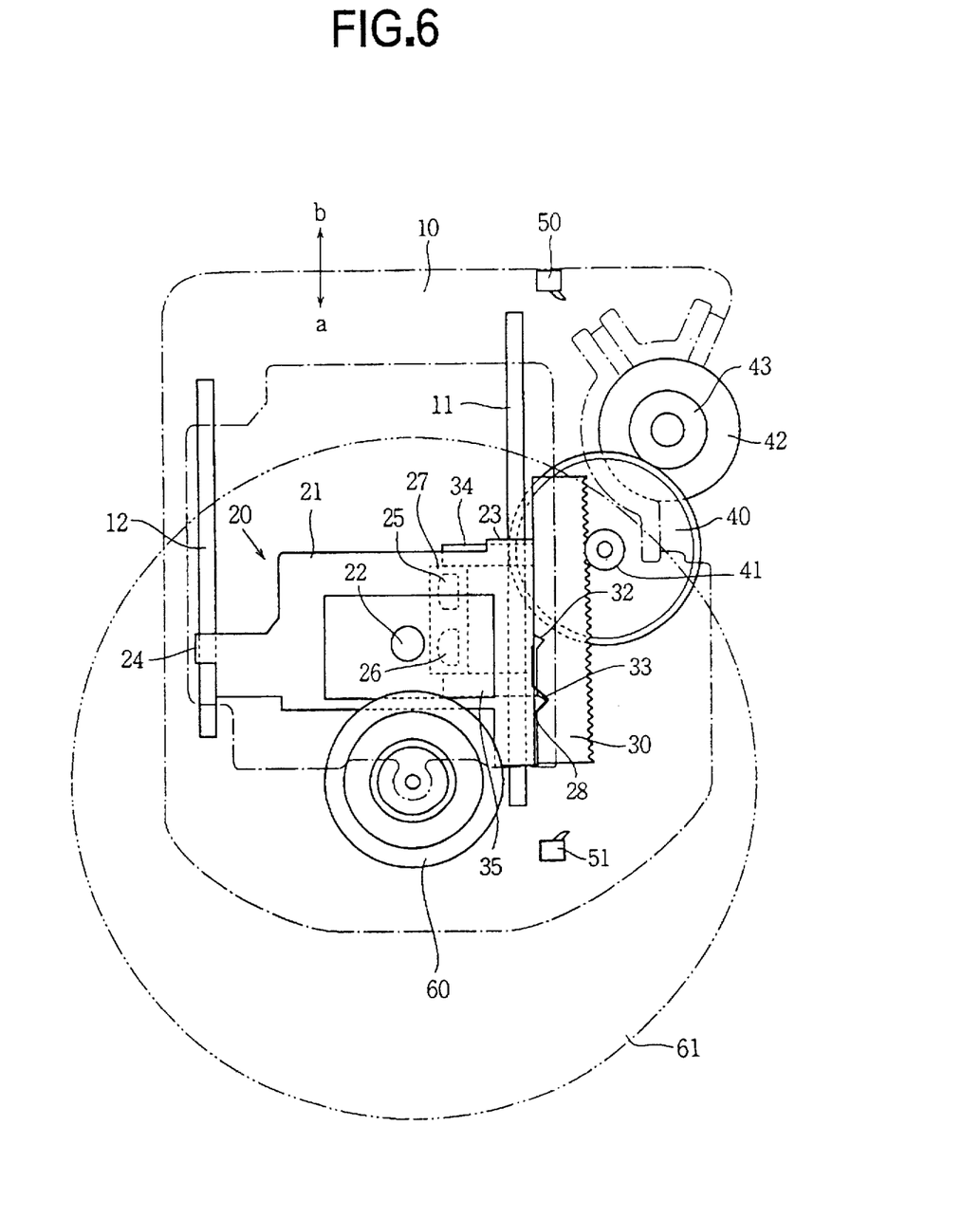
FIG. 6 is an enlarged plan view of the system of FIG. 2d.

When the pickup 20 is moved in the direction a together with the rack 30, an edge of the arm 23 on the guide shaft 11 is abutted on the inside wall of the opening 10a as shown in FIG. 6. Namely, the pickup is stopped at an innermost point by the inside wall as a stopper. In this case, the engaging spring 28 engages with the notch 33.

Figure 4:
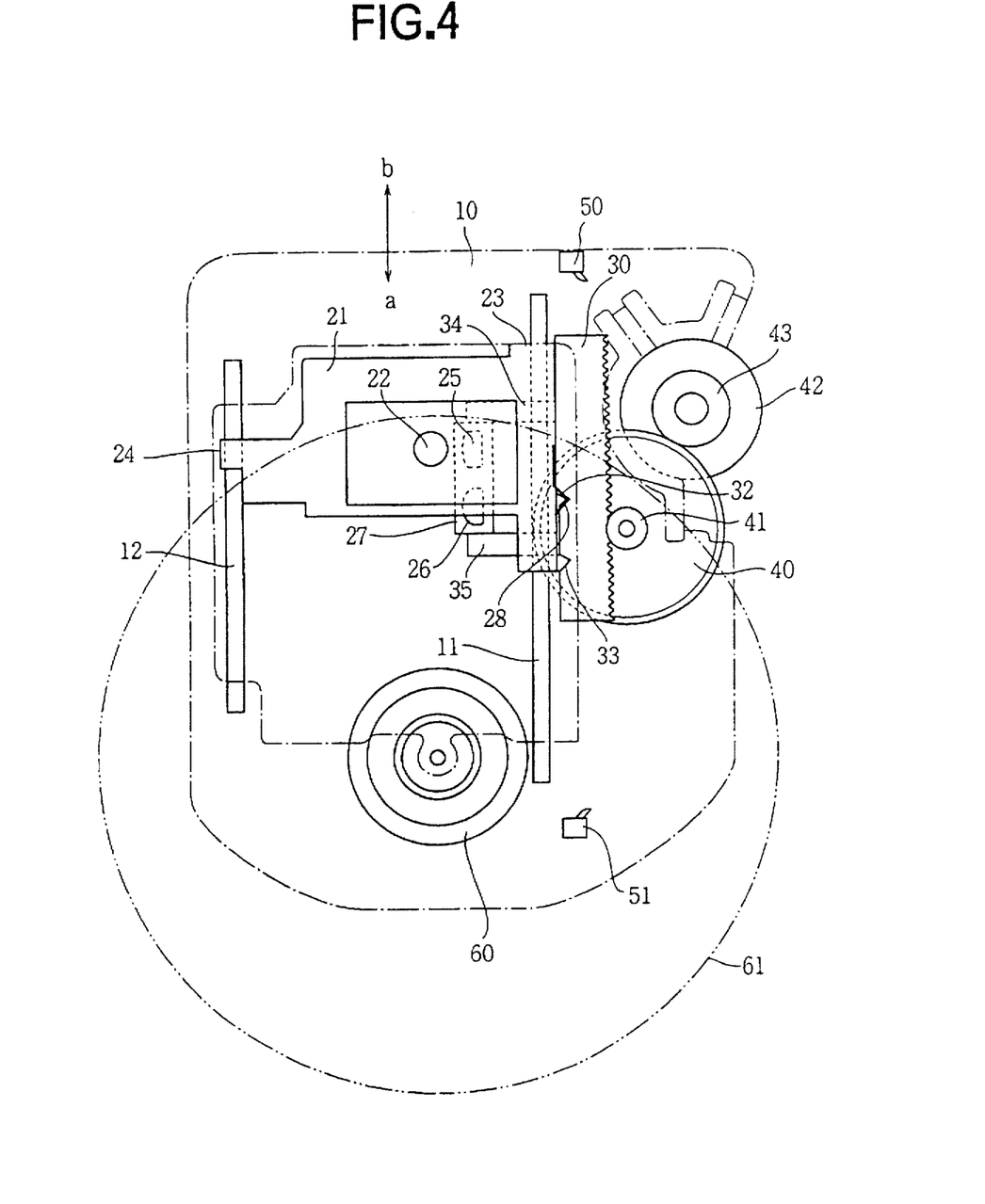
FIG. 4 is an enlarged plan view of the system of FIG. 2b.

On the other hand, when the pickup 20 is moved in the direction b by the rack 30, the other edge of the arm 23 is abutted on the opposite inside wall of the opening 10a as shown in FIG. 4. Namely, the pickup is stopped at an outermost point by the opposite inside wall. In this condition, the spring 28 engages with the notch 32.

Figure 3:
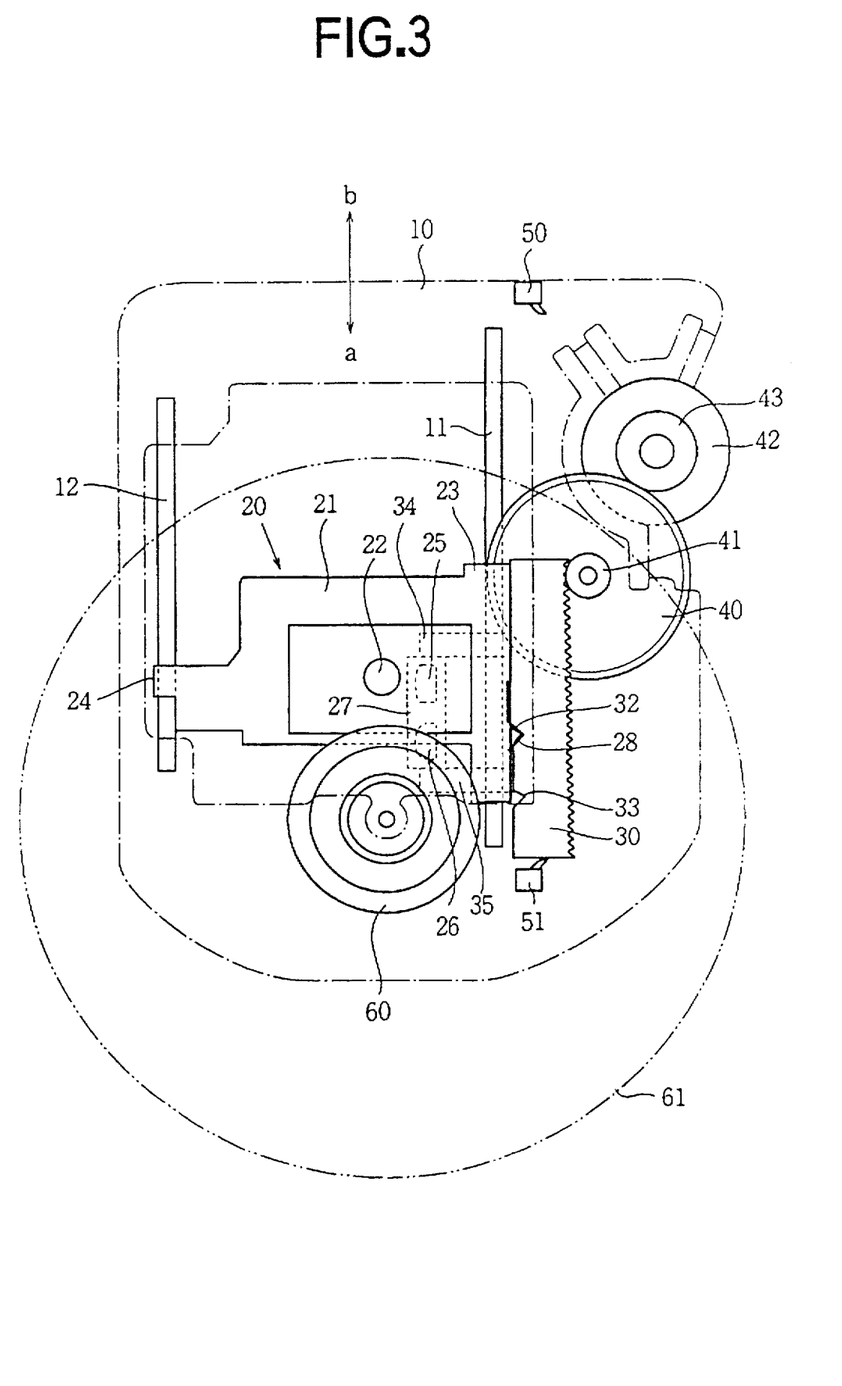
Figure 5:
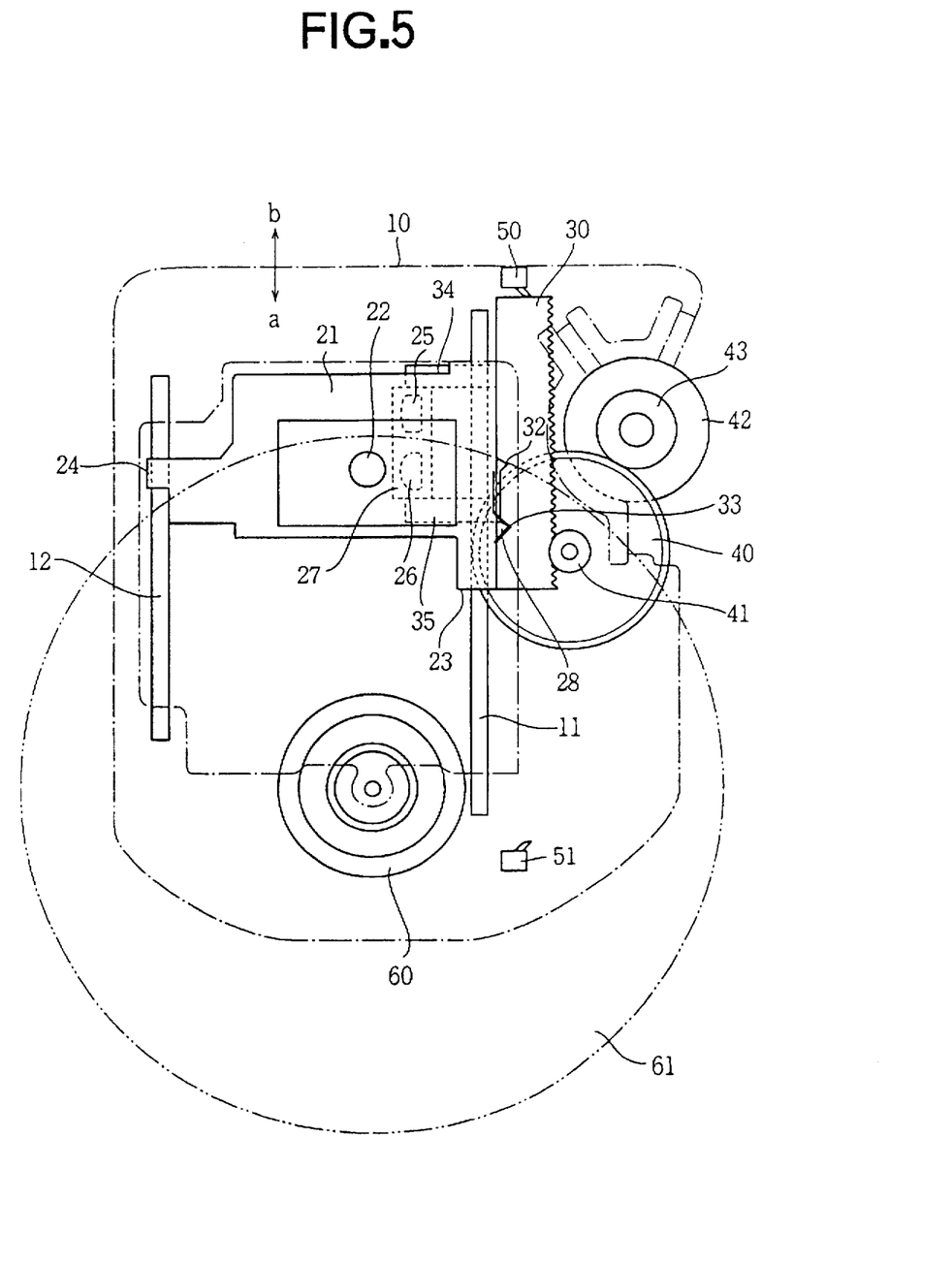
FIG. 5 is an enlarged plan view of the system of FIG. 2c.

In the embodiment, the rack 30 is adapted to be further moved to over-stroke areas beyond the innermost and outermost points of the pickup 20 as shown in FIGS. 3 and 5. On the over-stroke areas, a DVD switch 50 and a CD switch 51 are provided on the base plate 10. When opposite end portions of the rack 30 are engaged with the DVD and CD switches, respectively, the switches are turned on.

As shown in FIG. 5, when the rack 30 in FIG. 4 is further moved to the over-stroke area in the direction b after the pickup 20 is stopped by the stopper, the notch 32 of the rack disengages from the engaging spring 28, and the notch 33 engages with the engaging spring 28 at the stroke end. Since the panel 27 supported by the arms 34 and 35 of the rack is moved together, the optical element 25 departs from the objective lens 22, and the optical element 26 is positioned at the objective lens. Thus, the disc 61 of DVD is reproduced.

As shown in FIG. 3, when the rack 30 in FIG. 6 is further moved to the over-stroke area in the direction a after the pickup 20 is stopped by the stopper, the notch 33 disengages from the engaging spring 28, and the notch 32 engages with the engaging spring 28. Since the panel 27 is moved together, the optical element 26 departs from the objective lens 22, and the optical element 25 is positioned at the objective lens. Thus, the the disc 61 of CD is reproduced.

Figure 7:
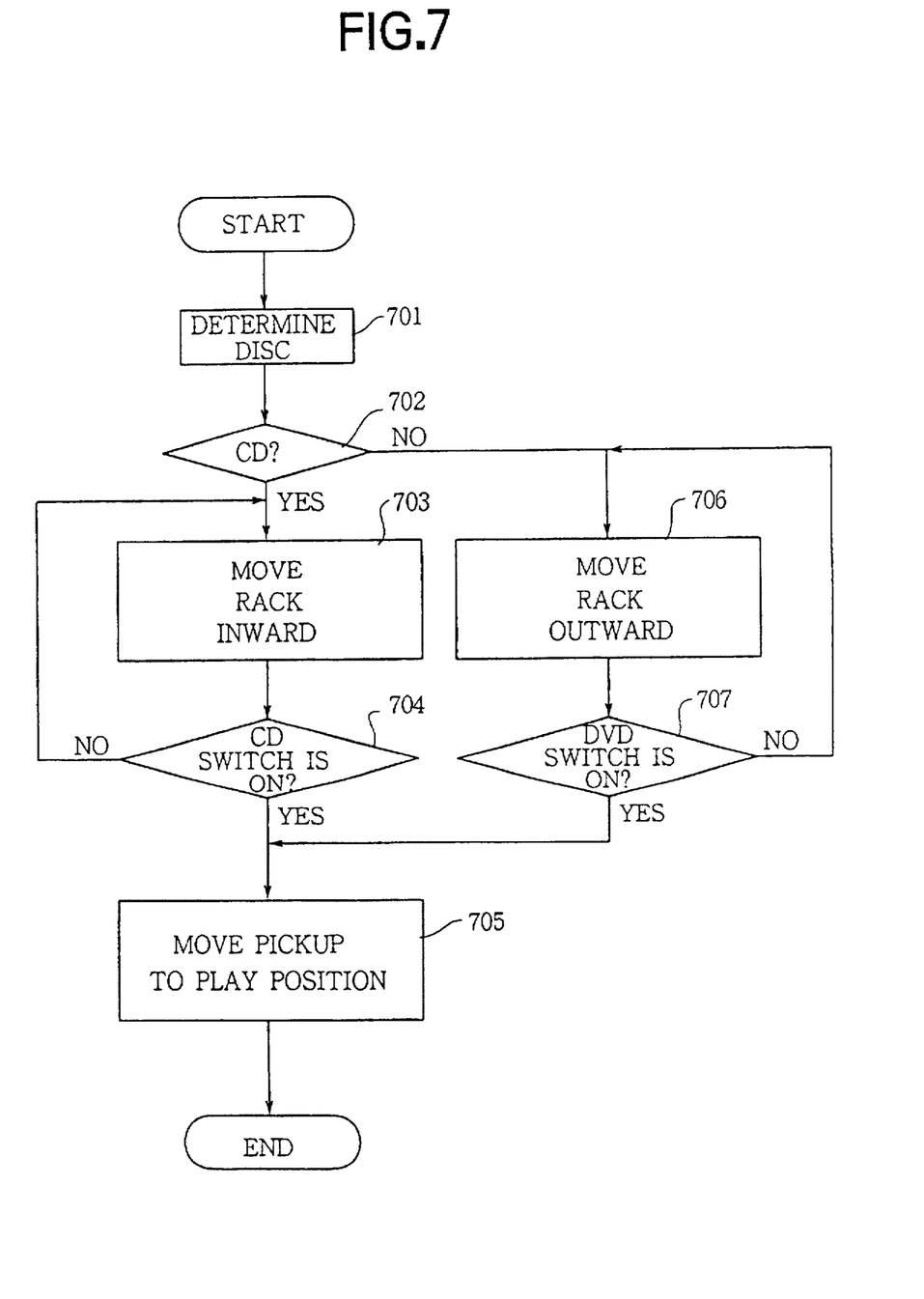
FIG. 7 is a flowchart showing the operation of the system.

The operation of the system will be described with reference to FIGS. 2a to 2d, and 3 to 6, and the flowchart of FIG. 7.

In FIG. 1, the notch 32 of the rack 30 is engaged with the engaging spring 28 of the pickup 20, and the optical element 25 of the panel 27 is positioned at the objective lens 22. Thus, the pickup 20 is operable for the CD.

First, it is determined whether the disc 61 to be reproduced is a CD or a DVD by focusing the laser beam on the recording surface of the disc (Step 701).

In the condition of DVD playing position of the pickup 20 shown in FIG. 5, where the notch 33 engages with the spring 28, if it is determined that the disc is the CD (Step 702), the rack 30 is moved in the direction a by the drive motor 42 (Step 703) together with the pickup 20.

Figure 2:
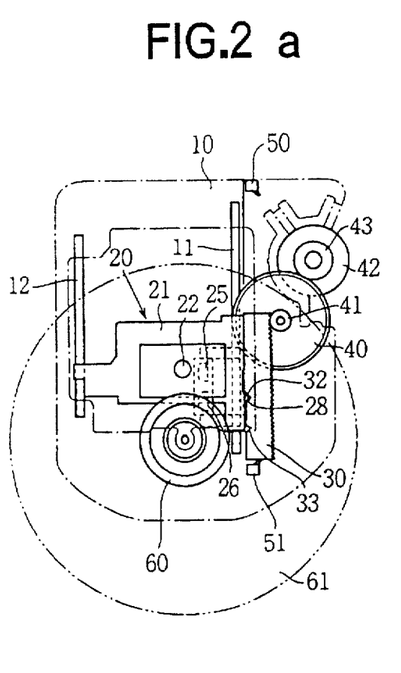
FIGS. 2a to 2d are diagrams showing the operation of the optical pickup system.

When the pickup 20 reaches the innermost point, the pickup is stopped by the stopper, and only the rack 30 is further moved to the over-stroke area in the direction a, and engaged with the CD switch 51 as shown in FIGS. 2a and 3 (Step 704). At that time, In this state, the notch 32 is engaged with the engaging spring 28. On the other hand, the panel 27 is moved to the position where the optical element 25 is positioned at the objective lens 22.

When the optical system in the optical pickup is changed corresponding to the CD, the the rack 30 is slightly moved in the reverse direction by the drive motor 42 together with the pickup 20, so that the objective lens 22 is returned to an innermost periphery of the disc 61 such as a TOC area (Step 705).

Thereafter, the pickup 20 is outwardly moved in the radial direction of the disc 61 so as to reproduce the CD as shown in FIGS. 2a and 2b.

On the other hand, if it is determined that the disc is the DVD at the Step 702 in the position of FIG. 3, the rack 30 is moved in the direction b by the drive motor 42 (Step 706) together with the pickup 20.

When the pickup 20 reaches the outermost point, the pickup is stopped by the stopper, and only the rack 30 is further moved to the over-stroke area in the direction b, and engaged with the DVD switch 50 as shown in FIGS. 2c and 5 (Step 707).

At that time, the notch 33 is engaged with the engaging spring 28. On the other hand, the panel 27 is moved to the position where the optical element 26 is positioned at the objective lens 22.

When the optical system in the optical pickup is changed corresponding to the CD, the the rack 30 is moved in the reverse direction by the drive motor 42 together with the pickup 20, so that the objective lens 22 is returned to an innermost periphery of the disc 61 such as a TOC area as shown in FIG. 6 (Step 705).

Thereafter, the pickup 20 is outwardly moved in the radial direction of the disc 61 so as to reproduce the DVD, as shown in FIGS. 2d and 2c.

In place of the rack 30, a screw-driven device may be employed. For example, on a shaft, a screw corresponding to the stroke including the over-stroke areas is formed, and the screw is engaged with a nut secured to the casing 21.

In accordance with the present invention, in order to record or reproduce the discs having a different standard, for example, a different thickness between the surface of the disc and the recording surface thereof such as CD and DVD, optical elements 25 and 26 are provided in the pickup 20. The rack 30 is engaged with the pickup through the engaging spring 28 for moving the pickup in the radial direction of the disc. The pickup 20 is moved between the innermost point and the outermost point. The rack 30 is adapted to be further moved to the over-stroke areas by changing the engagement of the engaging spring 28. In this state, the optical elements 25, 26 are changed in dependency on the standard of disc to be reproduces. Since it is not necessary to provide a drive member for changing the optical elements 25, 26, it is possible to recording or reproducing the discs having a different standard with a simple structure.

While the invention has been described in conjunction with preferred specific embodiment thereof, it will be understood that this description is intended to illustrate and not limit the scope of the invention, which is defined by the following claims.

What is claimed is:

1. An optical pickup system for an optical disc player for reproducing at least two kinds of discs which are different from each other in standard, comprising:

a pickup provided to be moved in a radial direction of said discs within a scan area;

a rack provided to be moved in the radial direction beyond said scan area to over-scan areas at opposite sides of the scan area;

at least two optical elements provided to be moved together with the rack for performing reproduction of the discs;

engaging means for detachably engaging the pickup and the rack in the scan area and in the over-scan areas, respectively;

driving means for moving the rack to the opposite over-scan areas;

a pair of stoppers for stopping the pickup engaged with the rack by the engaging means at opposite ends of the scan area so that relative positions of the pickup to the rack are changed in the over-scan areas, respectively;

said optical elements being arranged to effect the reproduction of a corresponding kind of disc based on the change of the relative position of the pickup.

2. The system according to claim 1 wherein the engaging means comprises an engaging spring having a V-shaped engaging tip provided on the pickup, and a pair of notches formed on the rack to be engaged with the V-shaped tip in respective reproducing operations.

3. The system according to claim 1 further comprising a pair of switches provided to be operated by the rack at opposite scan ends so as to perform respective reproducing operations.

4. The system according to claim 1 wherein the difference in standard is different in thickness of the discs.

5. The system according to claim 4 wherein the optical elements are elements for changing focused positions of laser beam in accordance with the thickness of the disc.

* * * * *